No. 812,879. PATENTED FEB. 20, 1906.
C. DE L. RICE.
FASTENING HOOK.
APPLICATION FILED AUG. 26, 1905.

UNITED STATES PATENT OFFICE.

CHARLES DE LOS RICE, OF HARTFORD, CONNECTICUT, ASSIGNOR TO UNDERWOOD TYPEWRITER COMPANY, OF NEW YORK, N. Y., A CORPORATION OF NEW JERSEY.

FASTENING-HOOK.

No. 812,879.      Specification of Letters Patent.      Patented Feb. 20, 1906.

Application filed August 26, 1905. Serial No. 275,940.

*To all whom it may concern:*

Be it known that I, CHARLES DE LOS RICE, a citizen of the United States, residing in Hartford, in the county of Hartford and State of Connecticut, have invented certain new and useful Improvements in Fastening-Hooks, of which the following is a specification.

This invention relates to metal hooks, and particularly to such as are used for attaching one article to another—as, for instance, in securing the sheet-metal case of a type-writing machine to its base-board. For such purposes it is necessary that the hook, which is usually hung upon the case, shall hold securely the screw which projects from the edge of the base-board. It has been the practice to provide the hook with a sliding bolt or guard, the latter having parts clasped tightly around the edges of the shank of the hook, so as to insure against loosening of the bolt when closed. Such friction, however, makes the bolt difficult to operate. The shank of the hook has been enlarged at its upper end, so as to render it impossible for the bolt to come off the hook, and in assembling the parts it has therefore been necessary to bend the fingers around the shank of the hook, this operation being expensive and otherwise objectionable.

The objects of my invention are to overcome these objections and to produce a hook in which the bolt shall be easily operated and yet shall remain securely closed, and also to reduce the cost of manufacture of the device.

Figure 1:
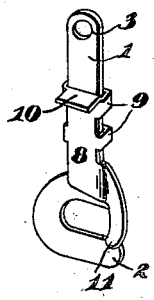
Figure 2:
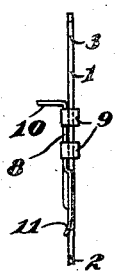

In the accompanying drawings, Figure 1 is a perspective view of my improved hook, showing the same closed. Fig. 2 is an edge view, and Fig. 3 a back view, of the same. Fig. 4 shows how the hook is used between the base-board and case of a type-writing machine, the hook being shown open to enable the case to be detached from the board.

The hook comprises a pendent part or shank 1 and a point 2, the shank having in its upper end an eye 3 for receiving loosely a shoulder-screw 4, which is secured in the side of a type-writer case 5.

As seen at Fig. 4, the point of the hook engages a screw 6, projecting from the edge of a base-board 7. The hook is made flat, so as to lie snugly against the case.

Figure 3:
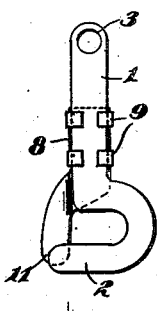
Figure 4:
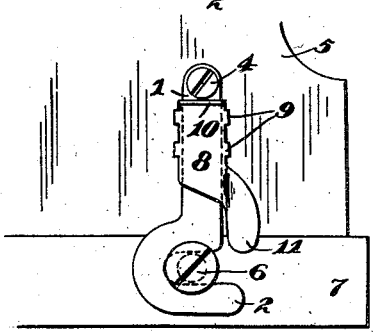

The bolt or guard comprises a body portion or shank 8, having upon its opposite edges fingers 9, which clasp the shank 1 of the hook, Fig. 3. The bolt is manipulated by means of a stud 10. It will be seen that both the bolt and hook are struck up from sheet metal and that the shank 1 of the hook is as wide throughout as it is at the top or eye portion. Such width is greater than accords with the strength of the hook and is provided for the purpose of enabling the bolt to be finished before placing it upon the shank of the hook. It will be seen that the bolt may be readily slipped on and off from said shank.

Preferably the bolt fits loosely upon the shank, so that it may drop of its own weight, and hence tend to keep the hook normally closed. At its lower end or tip the bolt is bent out slightly to form a lip, as at 11, Figs. 1 and 2, this bevel or lip portion riding down over the cheek of the point 2 of the hook in a manner to spring the bolt laterally, so that the bolt and point are sprung or held together with sufficient firmness to prevent accidental displacement.

The head of the screw 4, upon which the hook hangs, serves as a lock to prevent the bolt 8 from becoming detached.

Having thus described my invention, I claim—

1. A hook having a shank, and a bolt fitted around the shank and adapted to engage the point of the hook, said bolt constructed to slide onto or off from said shank.

2. A hook having a shank, and a bolt fitted around the shank and adapted to engage the point of the hook, said bolt constructed to slide onto or off from said shank, and the latter having an eye in its end, so that a screw or device upon which the hook is hung by means of said eye, may serve as a lock to prevent the bolt from becoming detached.

3. A flat hook struck up from sheet metal and having a shank formed with an eye in its end, the shank being as broad throughout as at the eye portion, and a flat sheet-metal bolt having members to clasp said shank, and constructed to slide upon the shank to close and open the hook.

4. A flat hook struck up from sheet metal and having a shank formed with an eye in its end, the shank being as broad throughout as at the eye portion, and a flat sheet-metal bolt having members to clasp said shank, and constructed to slide upon the shank to close and open the hook; said bolt constructed to slide past the point of the hook and to be sprung laterally thereby, so as to lock the hook closed.

CHARLES DE LOS RICE.

Witnesses:
    EDWIN C. SMITH,
    EDWARD P. STORY.